May 23, 1939. O. F. HOMEIER 2,159,852
PRESSING APPARATUS FOR ARTICLES SUCH AS VALVE STEMS
Filed Aug. 7, 1937
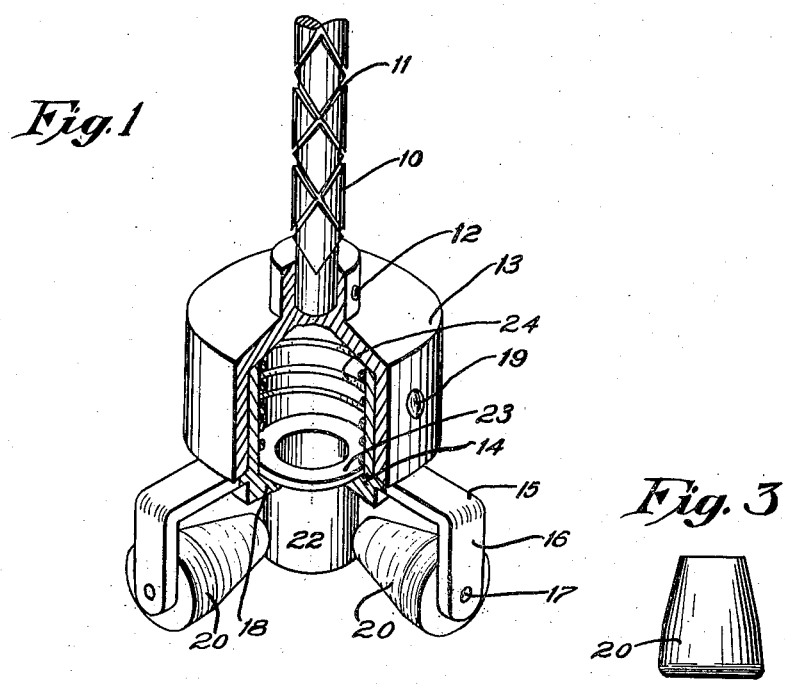
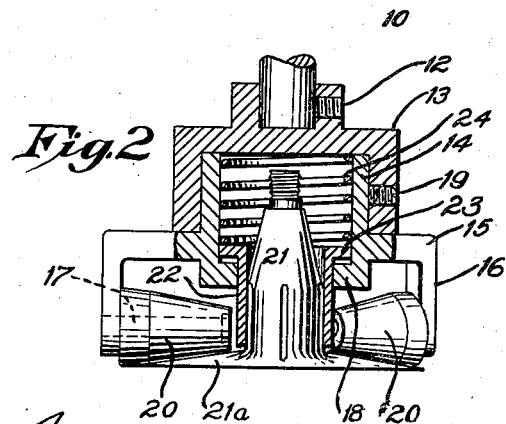
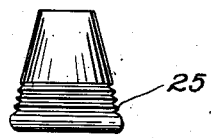
Inventor
Otto F. Homeier
By Willis F. Avery
Att'y Patented May 23, 1939

2,159,852

UNITED STATES PATENT OFFICE 2,159,852

PRESSING APPARATUS FOR ARTICLES SUCH AS VALVE STEMS

Otto F. Homeier, Akron, Ohio, assignor to The B. F. Goodrich Company, New York, N. Y., a corporation of New York Application August 7, 1937, Serial No. 157,990

5 Claims. (Cl. 154—9)

This invention relates to pressing apparatus suitable especially for stitching or rolling rubber valve stems or valve stems having rubber bases into adhesive engagement with inner tubes or other articles.

The principal objects of the invention are to remove entrapped air from between base of the stem and the article, to provide progressively applied rolling pressure, and to provide accurate centering of the stitching apparatus with relation to the valve stem, and to provide convenience of operation.

These and other objects will appear from the following description and the accompanying drawing.

Of the drawing:

Fig. 1 is a perspective view, partly broken away and partly in section showing the invention in its preferred form.

Fig. 2 is an axial cross sectional view of the same, showing the device in operative engagement with a rubber valve stem.

Fig. 3 is a side view of one of the rollers in its preferred form.

Fig. 4 is a similar view of a modified form of roller.

Referring to the drawing, the numeral 10 designates a rotatable spindle which may be provided with helical grooves 11 whereby it may be rotated by engagement with an axially movable member, as in a ratchet drill or screw driver of well known construction, although it it preferred to mount the spindle in a drill press or similar device whereby endwise pressure may be applied thereto while the spindle is simultaneously rotated. Fixed to the end of the spindle as by a set screw 12, is a roller head 13, cupped to receive a hollow spider sleeve 14 having a plurality of outwardly extending arms 15 formed with axially-extending portions 16 to which are fixed radially extending studs 17. The spider sleeve terminates in an inwardly-turned flange 18 for the purpose of supporting a pilot sleeve as hereinafter described, and is fixed within the roller head 13 as by a set-screw 19.

Journaled on each stud 17 for free rotation thereon is a conical roller 20, the taper of which is preferably complemental to the taper of the rubber base 21ª of the valve stem 21. These rollers are adapted to contact simultaneously with the base of the valve stem and to progressively roll or stitch it into adhesive engagement with the wall of the inner tube to which it is attached, the tube being supported by a convenient flat surface for the purpose of resisting the pressure.

To provide for guiding the rollers into engagement with the base of the valve stem in accurate alignment with the stem, a pilot tube 22, having a bore only slightly larger than the valve stem is slidably mounted in the spider shell 14 so as to depend therefrom normally below the lower faces of the rollers 20 and therebetween. An outwardly turned plunger 23 formed thereon engages over the shoulder 18 of the spider sleeve to prevent the pilot sleeve from dropping too low. A compression coil spring 24 is mounted in the spider sleeve between the flange 23 and the roller head 13 and is adapted to hold the pilot sleeve normally at its lowest position and to yield for the purpose of permitting advance of the rollers toward the work. The pilot sleeve is free to frictionally engage the work while the roller head is rotated thereabout. While the rollers 20 are preferably formed with plain conical faces, such rollers may be formed with circumferential ridges 25 (Fig. 4) where desired so as to facilitate lateral movement of the rubber being rolled to more thoroughly knit the rubber surfaces together, or the rollers may be knurled for the same purpose.

The provision of a plurality of the rollers, preferably three or more, about the pressure head facilitates the stable alignment of the apparatus on the stem, and the plurality of rollers pressing simultaneously at a plurality of positions on the base makes possible a more effective and rapid stitching.

In the use of the apparatus, a valve stem is placed on the side-wall of an inner tube supported by a flat surface. The spindle is advanced toward the valve so as to cause the valve stem to enter the pilot tube. Pressure is then exerted axially of the rotating head 13 to force the rollers against the base of the valve stem and roll it progressively into intimate engagement with the tube wall while the apparatus is rotated.

Various modifications of the apparatus may be made within the scope of the invention.

I claim:

1. Apparatus for rolling a valve stem into engagement with an article, said apparatus comprising a rotatable head, a pilot mounted thereon for cooperating with the stem of the valve to center the same with respect to the head, and a plurality of rollers mounted on said head and rotatable thereon on axes non-parallel to the axis of rotation of the head.

2. Apparatus for rolling a valve stem into engagement with an article, said apparatus comprising a rotatable head, a pilot resiliently mounted thereon for cooperating with the stem to center the same with respect to the head, and a plurality of rollers mounted on said head and rotatable thereon on axes non-parallel to the axis of rotation of the head.

3. Apparatus for rolling a valve stem into engagement with an article, said apparatus comprising a rotatable head, a hollow pilot resiliently mounted thereon for cooperating with the stem to center the same with respect to the head, and a plurality of rollers mounted on said head and rotatable thereon on axes non-parallel to the axis of rotation of the head.

4. Apparatus for rolling a valve stem into engagement with an article, said apparatus comprising a rotatable head, a hollow pilot resiliently mounted thereon and rotatable with respect thereto for cooperating with the stem of the valve to center the same with respect to the head, and at least three rollers mounted on said head and freely rotatable thereon on axes intersecting the axis of rotation of the head, said rollers having a surface form corresponding substantially to the surface of the base of the stem.

5. Apparatus for rolling a rubber valve stem into engagement with an article, said apparatus comprising a rotatable head, a plurality of rollers mounted thereon and rotatable on axes non-parallel to the axis of rotation of the head, said rollers having faces comprising projections and intervening grooves engageable with the rubber of the valve stem to induce forces acting in the plane of the article and of the face of the valve stem to assist in uniting the surfaces.

OTTO F. HOMEIER.